(12) United States Patent
Shen et al.

(10) Patent No.: US 11,863,427 B2
(45) Date of Patent: *Jan. 2, 2024

(54) MULTICAST PERFORMANCE ROUTING AND POLICY CONTROL IN SOFTWARE DEFINED WIDE AREA NETWORKS

(71) Applicant: Cisco Technology, Inc., San Jose, CA (US)

(72) Inventors: Changhong Shen, Shanghai (CN); Lianxiang Wang, Shangahi (CN); Yicheng Liu, Shanghai (CN); Xiaorong Wang, Shanghai (CN); Pan Wu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,376

(22) Filed: Jun. 23, 2022

(65) Prior Publication Data

US 2022/0393965 A1 Dec. 8, 2022

Related U.S. Application Data

(63) Continuation of application No. 16/854,328, filed on Apr. 21, 2020, now Pat. No. 11,411,857.

(60) Provisional application No. 62/939,893, filed on Nov. 25, 2019.

(51) Int. Cl.
| | |
|---|---|
| *H04L 12/28* | (2006.01) |
| *H04L 45/16* | (2022.01) |
| *H04L 12/18* | (2006.01) |
| *H04L 45/64* | (2022.01) |
| *H04L 45/02* | (2022.01) |

(52) U.S. Cl.
CPC ............ *H04L 45/16* (2013.01); *H04L 12/185* (2013.01); *H04L 45/02* (2013.01); *H04L 45/64* (2013.01)

(58) Field of Classification Search
CPC ....... H04L 45/16; H04L 12/185; H04L 45/02; H04L 45/64; H04L 45/306; H04L 45/48; H04L 45/04
USPC ........................................................ 370/390
See application file for complete search history.

(56) References Cited

U.S. PATENT DOCUMENTS

| | | | |
|---|---|---|---|
| 7,263,099 B1 | 8/2007 | Woo et al. | |
| 8,687,636 B1 | 4/2014 | Sivan et al. | |
| 9,838,327 B1 | 12/2017 | Ghosh et al. | |
| 10,237,206 B1 * | 3/2019 | Agrawal | H04L 45/16 |
| 10,404,619 B1 * | 9/2019 | Agrawal | H04L 45/7453 |
| 10,999,195 B1 * | 5/2021 | Suryanarayana | H04L 45/16 |

(Continued)

*Primary Examiner* — Chuong T Ho
(74) *Attorney, Agent, or Firm* — Polsinelli

(57) ABSTRACT

Systems and methods provide for enabling multicast-based performance routing and policy controls for software-defined networking in a wide area network deployment including a multicast application-route policy based on sources, groups, receivers, dynamic application-route policy path selection from multicast replicators, and application-route SLA switchover across paths and multicast replicators based on SD-WAN multicast routing architecture; and dynamically selecting SD-WAN multicast replicators based on policies for replication including allowed multicast groups, geographic location, bandwidth indications, system load, and performance, and switching over dynamically across multicast replicators based real-time multicast replicator status updates.

20 Claims, 8 Drawing Sheets

(56) References Cited

U.S. PATENT DOCUMENTS

| | | | |
|---|---|---|---|
| 11,088,916 | B1 | 8/2021 | Chandrashekhar et al. |
| 2011/0134925 | A1 | 6/2011 | Safrai et al. |
| 2016/0308696 | A1* | 10/2016 | Nishimura .............. H04L 45/38 |
| 2016/0315850 | A1* | 10/2016 | Dara ................... H04L 41/0853 |
| 2018/0375760 | A1 | 12/2018 | Saavedra |
| 2019/0123962 | A1 | 4/2019 | Guo et al. |
| 2019/0207844 | A1 | 7/2019 | Kodavanty et al. |
| 2019/0222537 | A1* | 7/2019 | Kodavanty ......... H04L 12/4633 |
| 2019/0334813 | A1 | 10/2019 | Raj et al. |
| 2020/0053023 | A1* | 2/2020 | Haag ................... H04L 12/5601 |
| 2020/0213199 | A1* | 7/2020 | Sethi ....................... H04L 41/40 |
| 2021/0099380 | A1 | 4/2021 | Suryanarayana et al. |
| 2021/0126866 | A1* | 4/2021 | Mathew ............... H04L 12/185 |

\* cited by examiner

MULTICAST PERFORMANCE ROUTING AND POLICY CONTROL IN SOFTWARE DEFINED WIDE AREA NETWORKS

CROSS-REFERENCE TO RELATED APPLICATIONS

This application is a continuation of U.S. application Ser. No. 16/854,328, filed on Apr. 21, 2020, which claims the benefit of priority under U.S.C. § 119(e) to U.S. Provisional Patent Application No. 62/939,893, filed on Nov. 25, 2019, the content of which is incorporated herein by reference in its entirety.

TECHNICAL FIELD

The subject matter of this disclosure relates in general to the field of computer networking, and more particularly, to multicast-based performance routing and policy control for software-defined wide area networks ("SD-WANs").

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, a multicast VPN solution has been developed that includes a BGP-based Next Generation MVPN that supports different types of tunneling technology. Specifically, SD-WAN overlay multicast can leverage an overlay management protocol (OMP) as a control plane protocol for signaling a message exchange with multicast protocols at customer VPNs. The tunneling for overlay-multicast (e.g., "Ingress Replication") can use IPSec tunnels as unicast traffic. While, SD-WAN unicast forwarding supports performance service level agreement (SLA)-based policy routing based on flow classification such as Prefix/Port, DSCP, or App-id/Group, similar multicast performance routing and policy control features remain absent from current SD-WAN solutions.

Furthermore, given the different working mechanisms between unicast and multicast forwarding, it is a huge challenge to implement traffic engineering and quality of service (QoS)-based multicast networks. For example, a multicast replicator is likely to be overloaded and congested if not properly load-balanced. This will not only impact the overall networking performance with mixed unicast and multicast traffic over the same overlay tunnel across the WAN, this will also result in network outages for SD-WAN networks due to the exponential expansion of bandwidth of the multicast traffic replication. Multicast replicators are typically responsible for traffic replication for SD-WAN multicast traffic, which usually becomes bottlenecked and congested.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
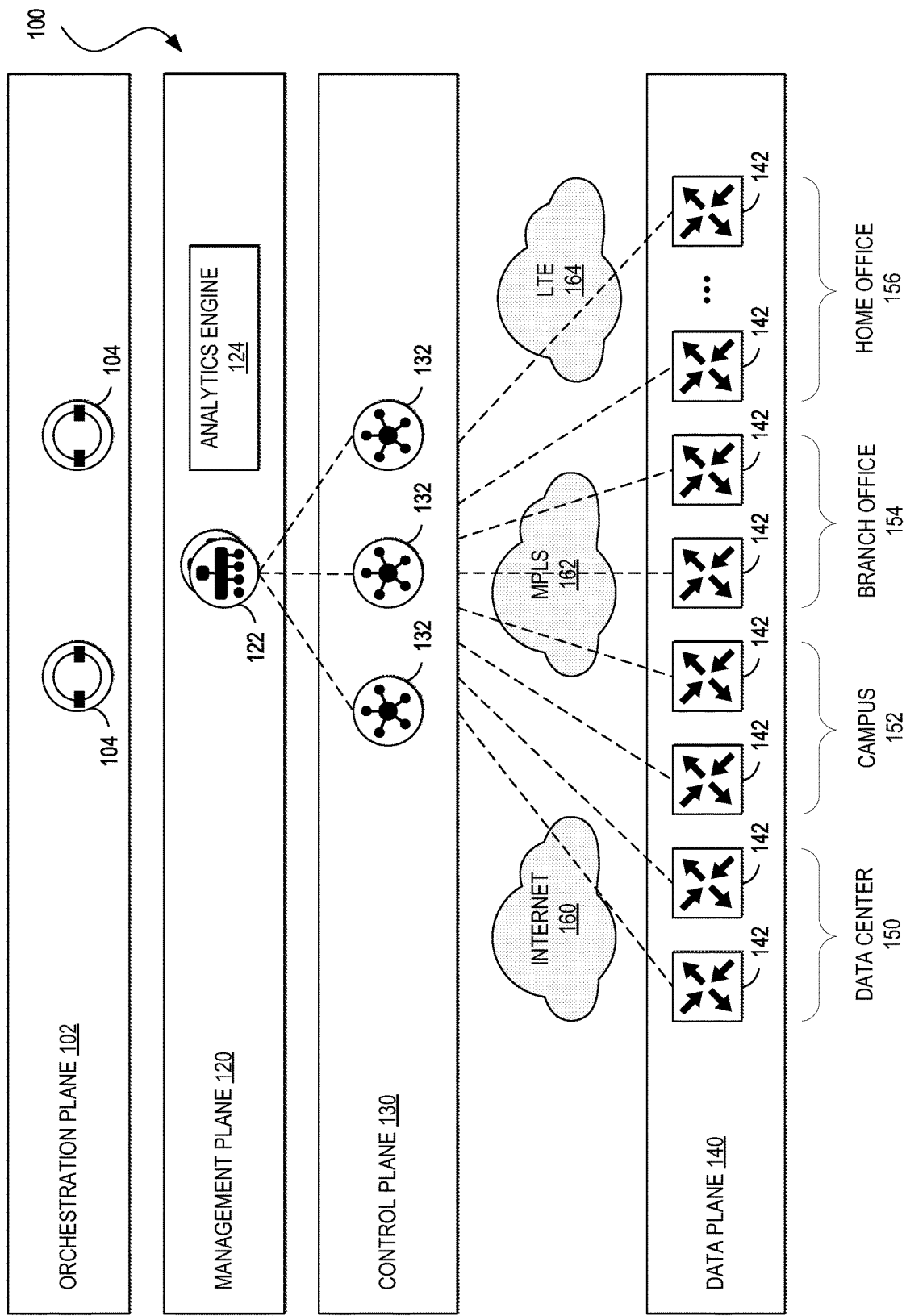
FIG. 1 illustrates an example network architecture, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable storage media for providing multicast-based performance routing and policy control for SDWANs.

A method can include connecting a SDWAN including a plurality of receivers and a plurality of multicast replicators. The plurality of multicast replicators forming a plurality of multicast groups in a network environment. The method can also include determining a multicast application-route policy to determine a connection path between the plurality of receivers and the multicast replicators. Further, the method can include selecting a first multicast replicator of the plurality of multicast replicators based on the multicast application-route policy. Additionally, the method can include switching connection paths between the plurality of receivers and the multicast replicators based on the selected first multicast replicator to dynamically tune an overlay multicast tree of the network environment.

The method can encompass situations when multicast application-route policy is based on at least one of the plurality of multicast groups, geographic location, bandwidth indications, system load, and performance. The method can also encompass situations when the switching of the connection paths occurs dynamically across the plurality of multicast replicators based on real-time selections of multicast replicators of the plurality of multicast replicators. The method can further include selecting a second multicast replicator of the plurality of multicast replicators based on the multicast application-route policy and switching the connection paths between the plurality of receiver and the multicast replicators based on selecting of the second multicast replicator to dynamically tune the overlay multicast tree of the network environment. The second multicast replicator is dynamically selected according to the multicast application-route policy based on changing network conditions in the network environment associated with the first multicast replicator. The changing network conditions in the network environment associated with the first multicast replicator include performance of the first multicast replicator operating to provide network service access through the overlay multicast tree in the network environment. The method can additional encompass when the first multicast replicator is configured to advertise replicator status information of the first multicast replicator to a plurality of multicast routers in the overlay multicast tree and at least one of the plurality of multicast routers are configured to facilitate the selection of first multicast replicator based on multicast application route-policy according to the advertised replicator status information of the first multicast replicator and the switching of the connection paths between the plurality of receivers and the multicast replicators based on the selection of the first multicast replicator. The method can moreover encompass when the multicast application-route policy is specific to one or more multicast groups and is selected based on inclusion of the first multicast replicator in the one or more multicast groups. The method can finally encompass when the multicast application-route policy is specific to one or more transport networks associated with multicast traffic and the application-route policy is selected based on a transport network associated with specific multicast traffic passing between the plurality of receivers and the multicast replicators. A system can include one or more processors and at least one computer-readable storage medium storing instructions which, when executed by the one or more processors, cause the one or more processors to connect an SDWAN including a plurality of receivers and a plurality of multicast replicators. The plurality of multicast replicators forming a plurality of multicast groups. The instructions can also cause the processor to determine a multicast application-route policy to determine a connection path between the plurality of receivers and the multicast replicators. Further, the instructions can cause the processor to select a first multicast replicator of the plurality of multicast replicators based on the multicast application-route policy. Additionally, the instructions can cause the processor to switch connection paths between the plurality of receivers and the multicast replicators based on the selected first multicast replicator.

A non-transitory computer-readable storage medium having stored therein instructions which, when executed by a processor, can cause the processor to connect an SDWAN including a plurality of receivers and a plurality of multicast replicators. The plurality of multicast replicators forming a plurality of multicast groups. The instructions can also cause the processor to determine a multicast application-route policy to determine a connection path between the plurality of receivers and the multicast replicators. Further, the instructions can cause the processor to select a first multicast replicator of the plurality of multicast replicators based on the multicast application-route policy. Additionally, the instructions can cause the processor to switch connection paths between the plurality of receivers and the multicast replicators based on the selected first multicast replicator.

DESCRIPTION

The disclosed technology addresses the need in the art for efficiently and effectively controlling multicast routing in SDWANs. The present technology involves system, methods, and computer-readable media for providing multicast performance routing and policy control in SDWANs. Further, the present technology involves systems, methods, and computer-readable media for controlling multicast replicators in SDWANs based on load and performance conditions.

FIG. 1 illustrates an example of a network architecture 100 for implementing aspects of the present technology. An example of an implementation of the network architecture 100 is the Cisco® SDWAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122. The management plane 120 can include an analytics engine 124 to provide analytics for the network.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
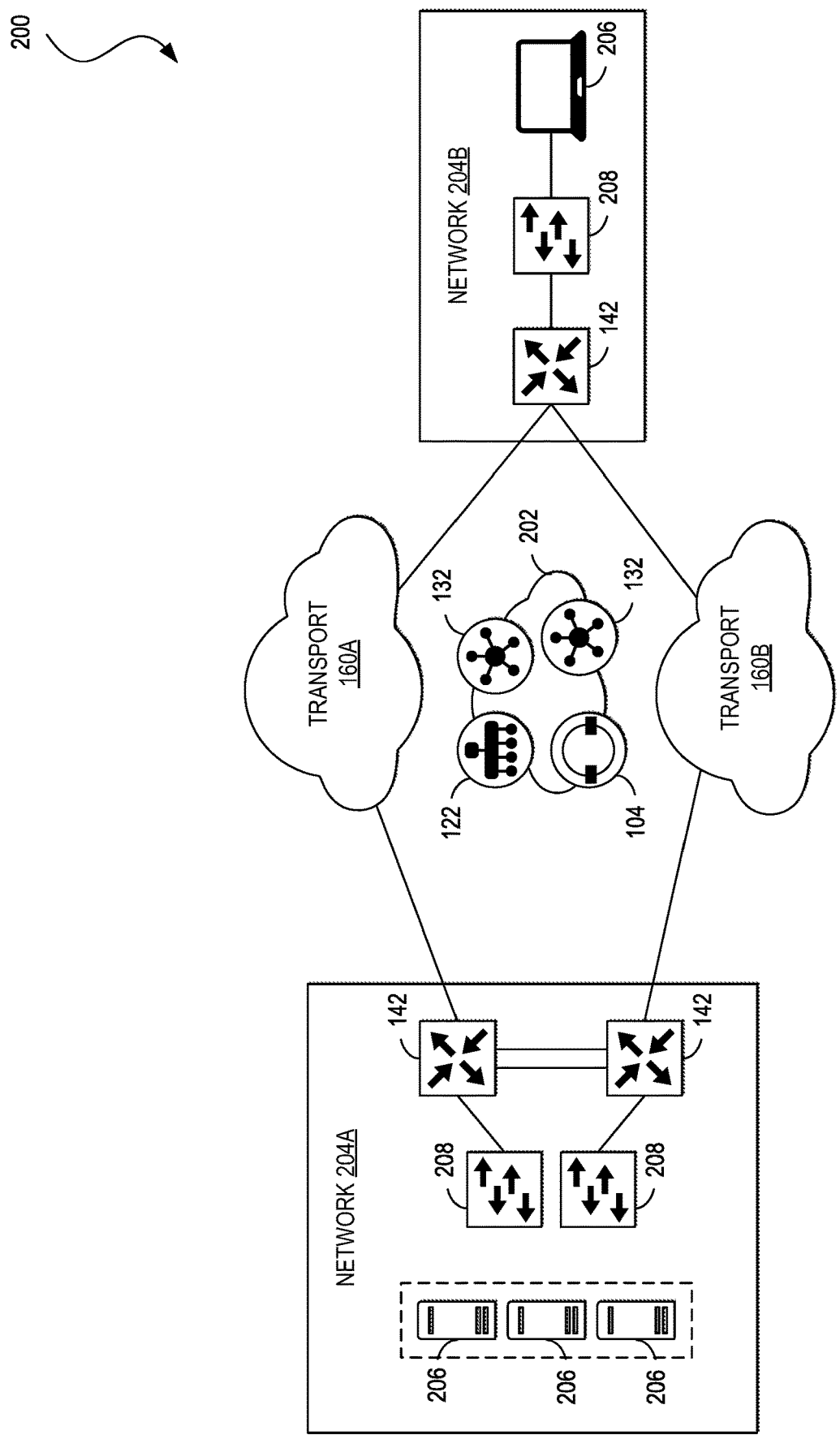
FIG. 2 illustrates an example network topology, in accordance with some embodiments.

FIG. 2 illustrates an example of a network topology 200 showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (MIDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, doorbells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
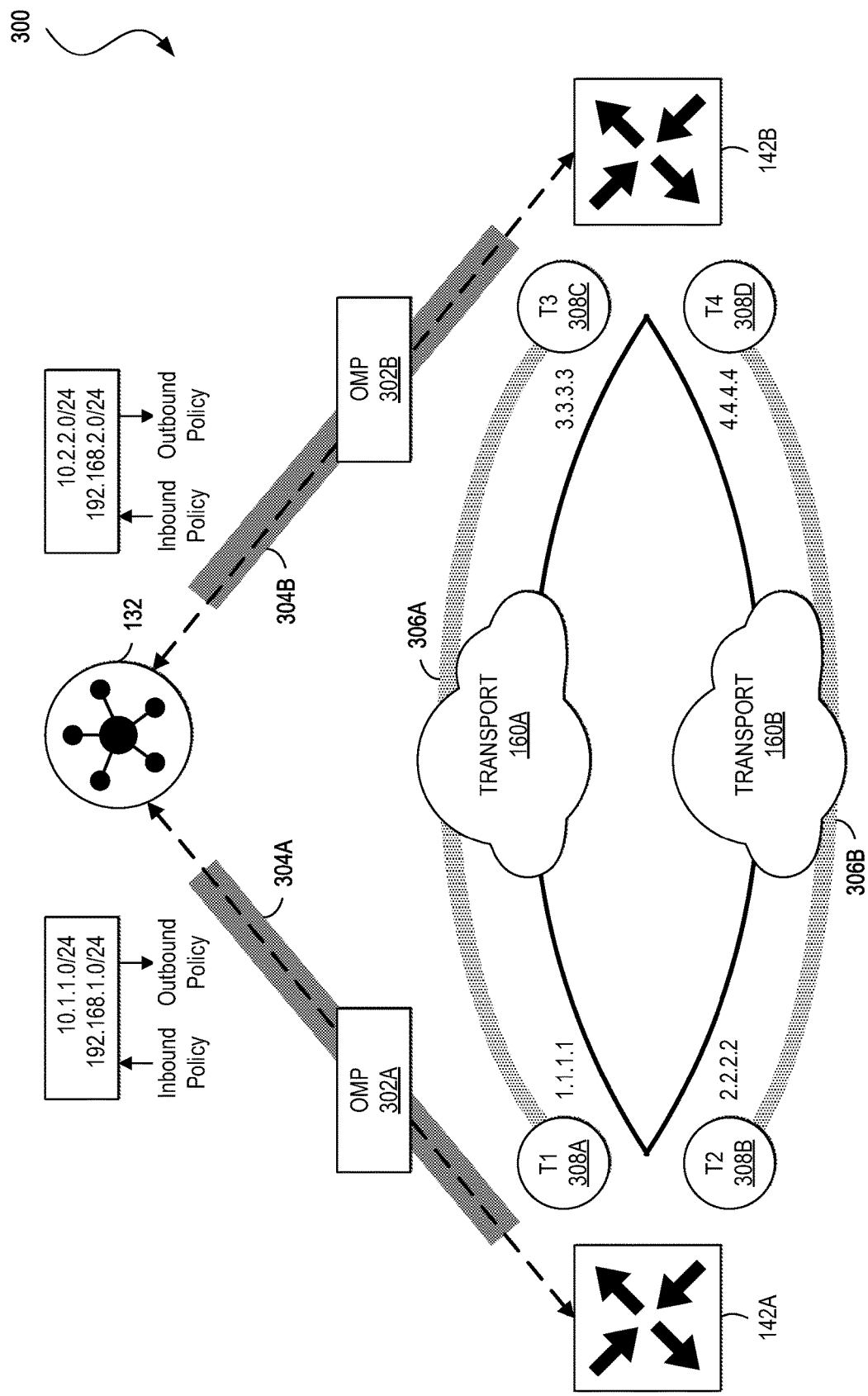
FIG. 3 illustrates an example diagram showing the operation of an OMP, in accordance with some embodiments.

FIG. 3 illustrates an example of a diagram 300 showing the operation of an OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can Advertise Three Types of Routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
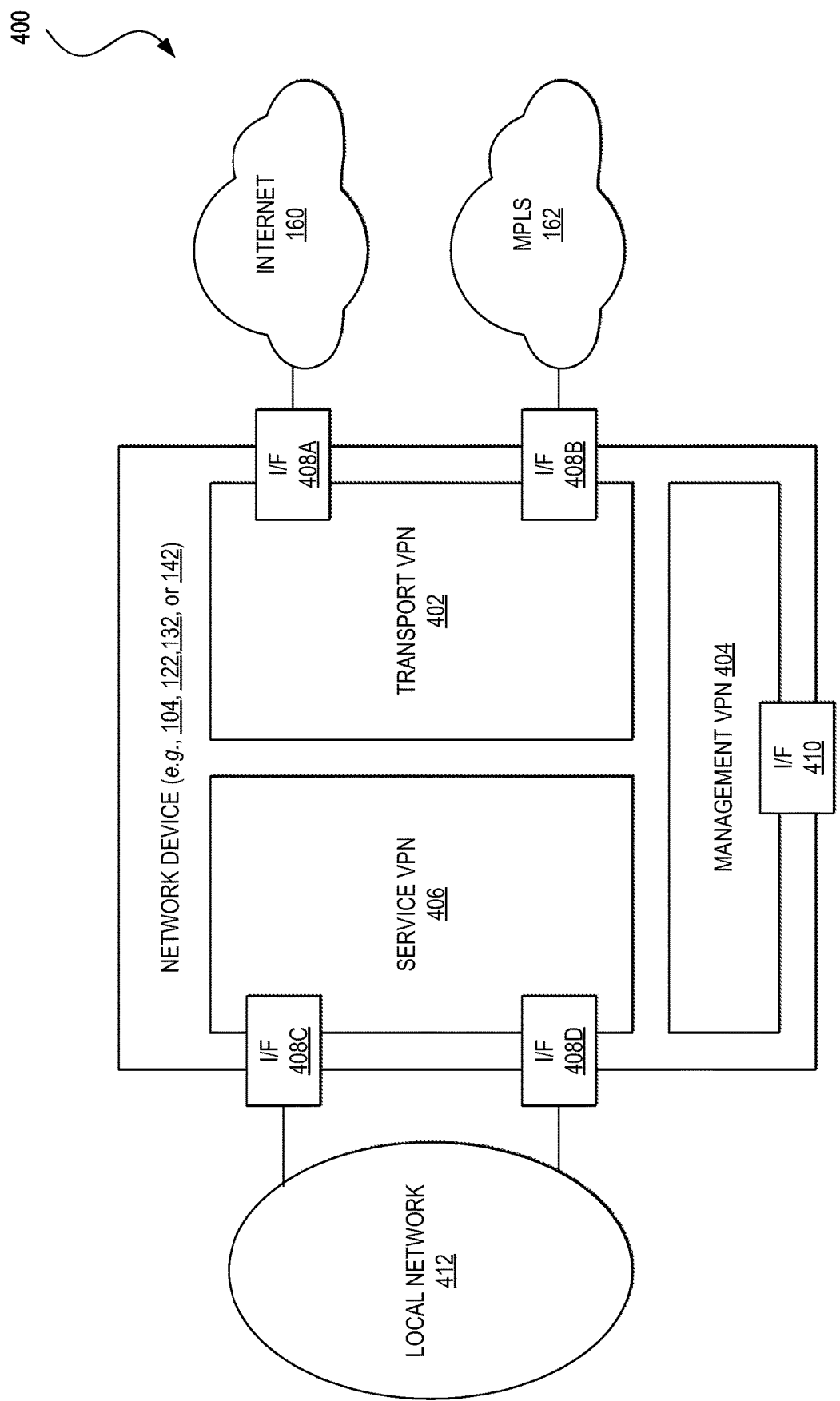
FIG. 4 illustrates an example diagram showing the operation of VPNs, in accordance with some embodiments.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

As discussed previously, a multicast VPN solution has been developed that includes a BGP-based Next Generation MVPN that supports different types of tunneling technology. Specifically, SD-WAN overlay multicast can leverage an overlay management protocol (OMP) as a control plane protocol for signaling a message exchange with multicast protocols at customer VPNs. The tunneling for overlay-multicast (e.g., "Ingress Replication") can use IPSec tunnels as unicast traffic. While, SD-WAN unicast forwarding supports performance service level agreement (SLA)-based policy routing based on flow classification such as Prefix/Port, DSCP, or App-id/Group, similar multicast performance routing and policy control features remain absent from current SD-WAN solutions. There therefore exist needs for systems, methods, and computer-readable media for providing the features of SD-WAN unicast forwarding in multicast routing in SD-WANs.

Furthermore, given the different working mechanisms between unicast and multicast forwarding, it is a huge challenge to implement traffic engineering and quality of service (QoS)-based multicast networks. For example, a multicast replicator is likely to be overloaded and congested if not properly load-balanced. This will not only impact the overall networking performance with mixed unicast and multicast traffic over the same overlay tunnel across the WAN, this will also result in network outages for SD-WAN networks due to the exponential expansion of bandwidth of the multicast traffic replication. Multicast replicators are typically responsible for traffic replication for SD-WAN multicast traffic, which usually becomes bottlenecked and congested. There therefore exist needs for systems, methods, and computer-readable media for controlling multicast replicators to reduce bottlenecks and congestion in multicast routing in SD-WANs.

The present includes systems, methods, and computer-readable media for solving these problems/discrepancies.

Figure 5A:
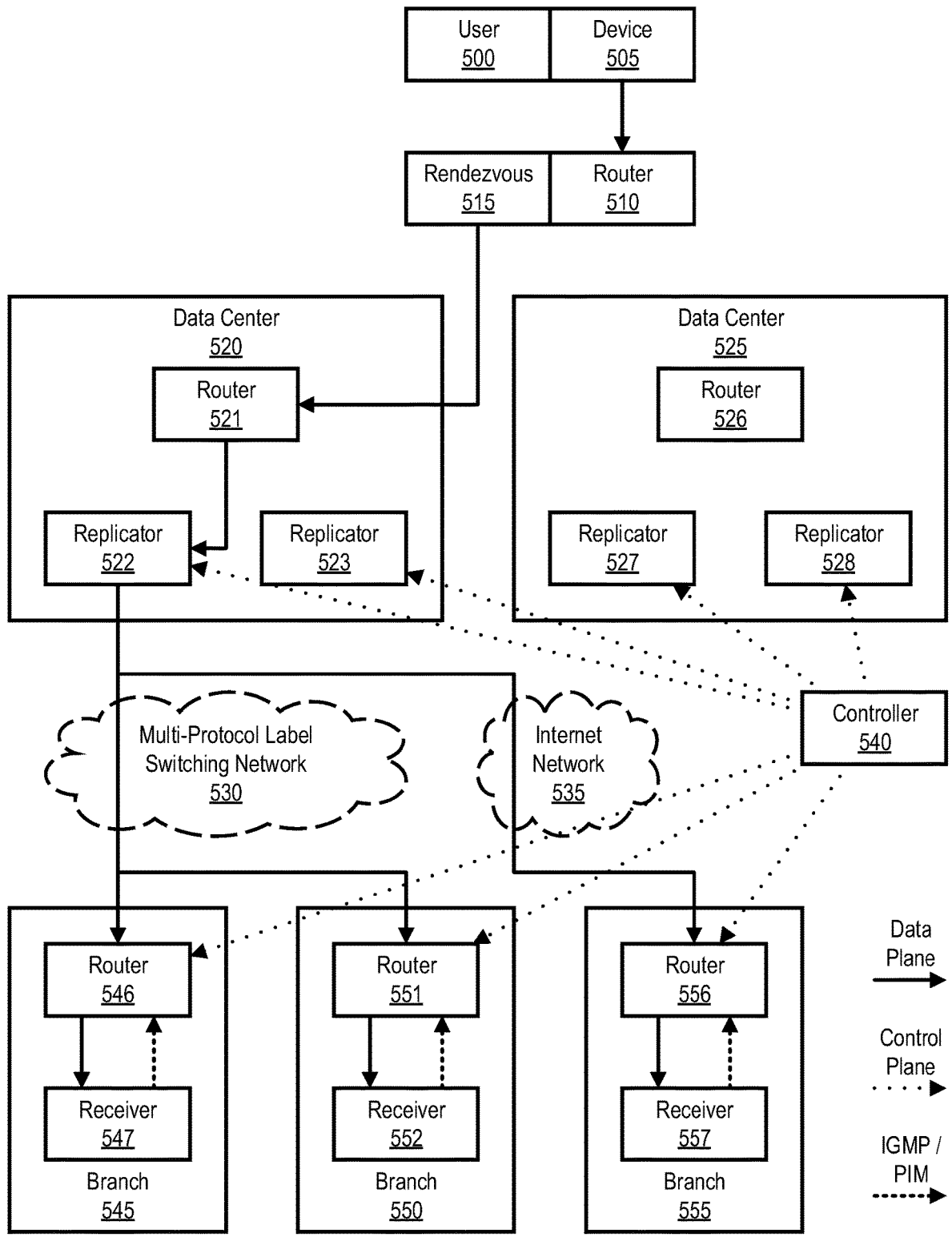
FIGS. 5A and 5B illustrate an example of a topology for dynamic selection of multicast replicators in accordance with some embodiments.
Figure 5B:
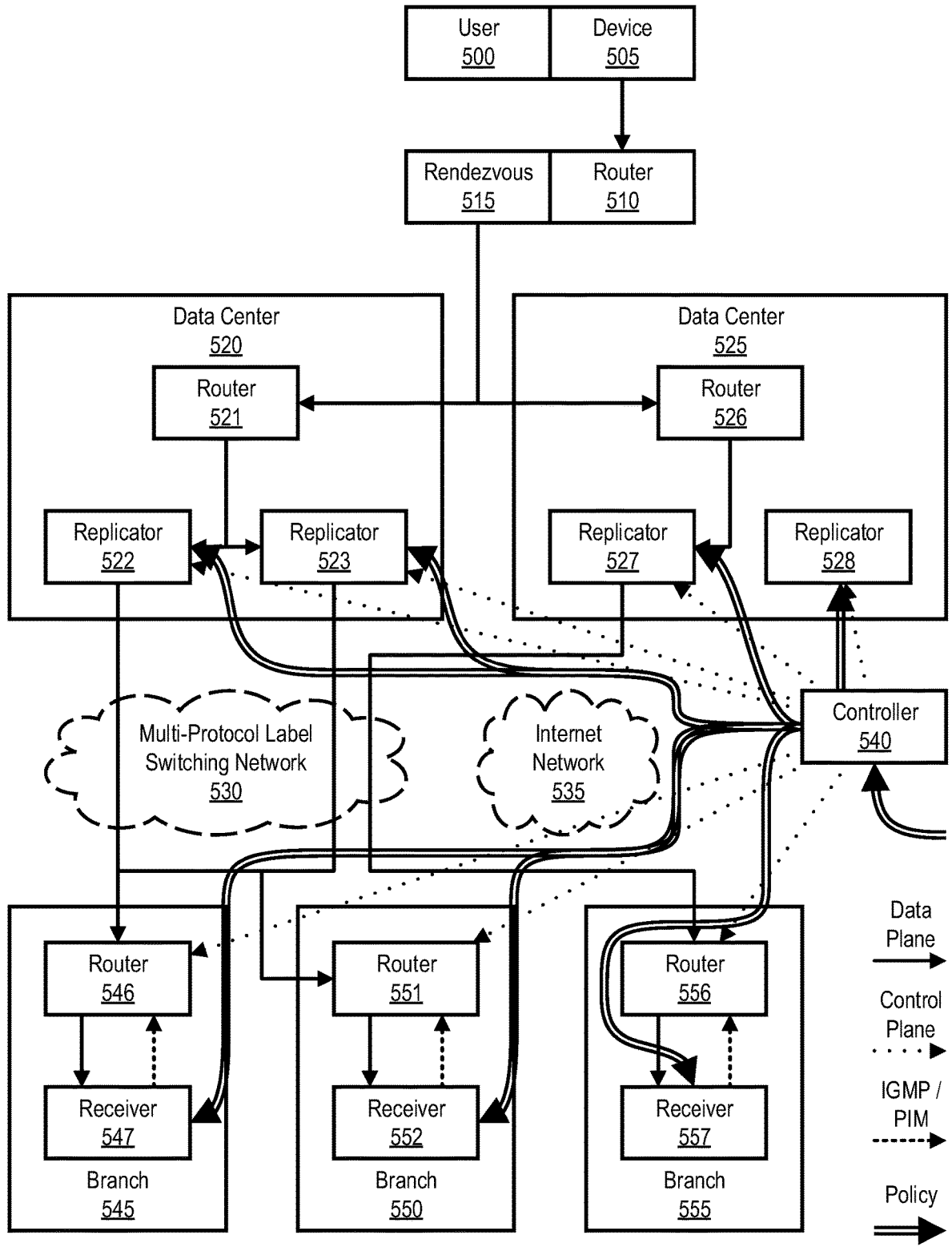

FIGS. 5A and 5B illustrate an example of a topology for selection of multicast replicators. FIG. 5A illustrates static methods for selecting multicast replicators in a typical deployment without the benefit of the present technology. FIG. 5B illustrates the present disclosure's methods for selecting multicast replicators in a typical deployment, showing the changes in methods and improvements in deployment achieved through the disclosed technology from FIG. 5A.

Multicast virtual private network (VPN) solutions can leverage a variety of different protocols, such as border gate protocol (BGP), which support various kinds of tunneling technologies, or overlay management protocol (OMP), which supports IP Security (IPsec) tunneling. While current unicast forwarding solutions can support routing based on flow classifications including differentiated services code points (DSCP), application ID, group ID, etc., there does not exist such a solution for multicast situations. Furthermore, dynamic changes to multicast forwarding to account for load and performance are lacking, despite the necessity of avoiding overload, congestion, and load imbalance.

There is a glaring need in the art for multicast forwarding solutions that allow for dynamic forwarding adjustments based on policy and performance. The present disclosure aims to address this need.

A user 500 using a device 505 can send a network packet to a router 510 on a software-defined network. User 500 can be an employee, contractor, patron, or private individual, while device 505 can be a laptop, tablet, smartphone, or other networking device. Router 510 can receive the packet and pass it through rendezvous 515, which can route packets through data centers 520 and 525.

Data centers 520 and 525 each contain multicast replicators 522, 523, 526, and 527. In traditional multicast deployments, multicast replicators 522, 523, 526, and 527 can advertise auto-discovery routes, including attributes like preference, threshold, and location (GPS), etc. Routers 546, 551, and 556 in branch sites 545, 550 and 555, respectively, can receive internet group multicast protocol (IGMP) or protocol-independent multicast (PIM) joins from receivers 547, 552, and 557, respectively. Routers 546, 551, and 556 can use simple algorithms to choose the best available multicast replicator 522, 523, 526, or 527, using attributes like preference, threshold, or location. After selection, routers 546, 551, and 556 can join a multicast tree using OMP. Controller 540 can coordinate the control plane among replicators 522, 523, 527, and 528, and routers 546, 551, and 556. Data plane packets can pass through either multiprotocol label switching network 530 or internet network 535. This process and resultant multicast tree, using these traditional methods, is shown in FIG. 5A. In some embodiments, multicast replicators 522, 523, 526, or 527 can include higher performance and throughput with maximum (*,G) and (S,G) joins and tunnel outgoing interfaces.

These existing standards do not account for policies that may be pursuant to user 500, device 505, receivers 547, 552, or 557, or other network packet factors. Furthermore, dynamic multicast deployment that accounts for changing policies or performance considerations are missing entirely. The present disclosure addresses these deficiencies in order to create a better deployment scheme, as shown in FIG. 5B.

Controller 540 can receive policies from a network administrator and publish these policies to all multicast replicators 522, 523, 527, and 528 as well as multicast routers 546, 551, and 556. These policies can apply based on source of the traffic, the context of user 500, the context of device 505, or other factors. Different policies can have different service-level agreement (SLA) requirements and path-preferences.

SLA requirements can be classified and also based on a specific receiver 547, 552, or 557. An example SLA requirement policy can look like this, in which SLA requirements can be triggered by a multicast receiver router as part of the OMP PIM join message:

```
policy
    sla-class video__sla__class
        loss 1
        latency 25
        jitter 50
    !
    sla-class audio__sla__class
        loss 1
        latency 25
        jitter 50
    !
    app-route-policy test__app__route__policy
        vpn-list vpn__list
            sequence 100
                match
                    source-ip 10.1.1.1/32
                    destination-ip 232.1.1.1/32
                !
```

-continued

```
                action
                    sla-class video__sla__class strict preferred-color biz-
internet public-internet
                !
            !
            sequence 200
                match
                    source-ip 10.2.2.2/32
                    destination-ip 232.2.2.2/32
                !
                action
                    sla-class strict audio__sla__class preferred-color public-
internet
                !
            !
        !
    !
```

When a receiver 547, 552, or 557 connects to a router 545, 550, or 555, the IGMP/PIM messages indicate information about the receiver's policy status, such as user context or device context. When replicators 522, 523, 527, or 528 publish a multicast auto-discover route, they can publish information relevant to load management, such as preference, threshold, leafs, location, load utilization, bandwidth indicators, or other relevant factors. Then, a receiver 547, 552, or 557, paired with a router 545, 550, or 555, can choose a deployment from the available replicators 522, 523, 527, and 528 based on policy considerations as well as load management considerations. In some embodiments, receivers 547, 552, or 557 can be running on a customer VPN.

Multicast deployments can have different characteristics and consumption models when compared to unicast, and a multicast policy can be used to match particular source, group, or receiver pair and SLA requirements. In some embodiments, multicast replication can download and use transport tunnels between multicast replication and receiver routers.

In FIG. 5B, these changes are implemented, and resultant changes in the data plane are visible. Policy information can be sent from controller 540 and received by replicators 522, 523, 527, and 528 and receivers 547, 552, and 557. Receiver 547 receives data from replicator 522 via network 530 and receiver 557 receives data from replicator 527 via network 530.

Receiver 552 initially receives data from replicator 522 via network 530. However, as replicator 522 is then serving both receiver 547 and receiver 552, it can become overloaded and yield poor QoS. Replicator 522 can then publish its load information. Multicast bandwidth can be explosive based on the number of regress replications or receivers, and can become congested on egress WAN interfaces. In response, receiver 522 can choose to dynamically switch its service deployment from replicator 522 to replicator 523 via network 530, resulting in improved quality of service due to the dynamic switching capabilities of the present technology.

To make the switch, branch 550 can send an OMP join message via router 551 to replicator 523. Replicator 523 can forward this OMP join via router 521 to rendezvous point 515, which can route the multicast deployment to replicator 523. When receiver 552 receives its first network packet from replicator 523, it can send an OMP prune message to replicator 522 to stop the old multicast forwarding tree.

In some embodiments, after a multicast forwarding tree and route are established, instead of using a single hash lookup for a "system-IP" with multiple SD-WAN tunnels going to a remote node of "system-IP" for label-switched multicast (LSM) replication encapsulation, a candidate next-hop or tunnel can be downloaded and used for app-route path selection. This can provide significant benefits for bandwidth utilization for multiple transports based on weight and bandwidth capacity. Furthermore, some transports can be excluded and used for multicast flows for security and cost perspective. In another example, a multicast app-route policy can evaluate the SLA metric in real-time and switch from one path to another if there is a SLA violation without the need of involving a multicast control-plane from a multicast reflector to a branch site receiver.

In another embodiment, multicast receivers can evaluate SLA metrics. If a multicast replicator is congested and overloaded with available WAN paths for multicast flows, an app-route probe can detect the performance downgrade and send a SLA violation to an SD-WAN control-plane. Thereafter, an OMP agent can process the events and evaluate all of the available multicast replicators within the domain. A new multicast replicator can be selected based on a number of selection criteria such as preference, replication threshold, load, and SLA metrics. A multicast receiver router can include an OMP multicast join message for a new replicator and setup an optimized multicast tree and forwarding path. Once the multicast tree setup is successful, the multicast receiver can switch from an old reflector to a new reflector with an OMP multicast punt message that can be sent to the old replicator.

Figure 6:
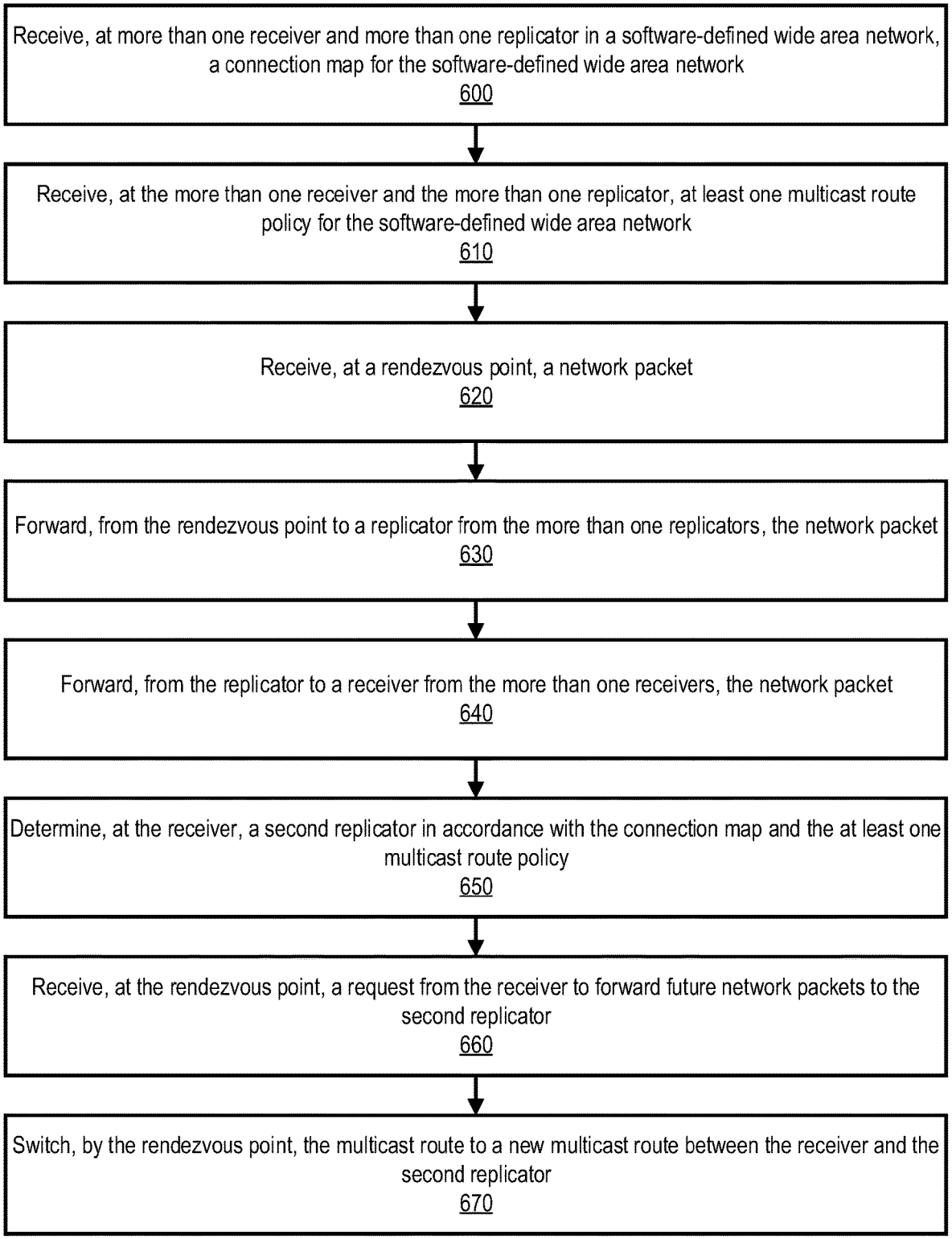
FIG. 6 illustrates an example method in accordance with an embodiment.

FIG. 6 illustrates an example method in accordance with various aspects of the present disclosure. The method illustrated can be carried out by the system illustrated in FIG. 5B. However, nothing in FIG. 6 should be considered limiting of the system illustrated in FIG. 5B, and likewise, the system illustrated in FIG. 5B should not be interpreted to limit the method of FIG. 6. Any limitation of the depicted system or method will be recited in the appended claims.

The method begins when replicators 522, 523, 527, and 528 and receivers 547, 552, and 557 receive (600) a connection map for the network shown in FIG. 5B. This map allows receivers and replicators to know what data centers 520 and 525 are present and, for receivers 547, 552, and 557, what replicators 522, 523, 527, and 528 are available. Controller 540 sends at least one multicast route policy for the network to replicators 522, 523, 527, and 528 and receivers 547, 552, and 552, which receive (610) the policy or set of policies. These policies may be based on multicast groups, geographic location, bandwidth indications, system load, or performance.

Rendezvous point 515 receives (620) a network packet from user 500 via device 505 and router 510. Upon receiving the network packet, rendezvous point may have information available about the SD-WAN, device 505, and user 500, among other possible information. Rendezvous point may reside within the SD-WAN or outside the SD-WAN. It uses this information to forward (630) the network packet to one of replicators 522, 523, 527, and 528. As shown in FIG. 5B, replicators 522, 523, and 527 are selected from the set of replicators to create a multicast route towards receivers 547, 552, and 557.

Replicators 547, 552, and 557 forward (640) the network packets through the multicast tree to receivers 547, 552, and 557. Each receiver 547, 552, or 557 chooses its own replicator from the available multicast auto-discovery route options, based on considerations from policy, performance, system balance, or load management.

After a time, changes to the multicast tree can mean that switching replicators could result in better system performance. Replicator 522 becomes overloaded handling the traffic for receiver 547 and 552. When this information is published, receiver 552 can determine (650) to switch replicators, in this case to replicator 523. Rendezvous point 515 receives (660) this request from receiver 552 to recast the multicast tree through replicator 523.

Rendezvous point 515 switches (670) the multicast route to pass through replicator 523 to receiver 552. To do this, it leaves open the old multicast route through replicator 522 while beginning to forward data through replicator 523. Once receiver 552 receives its first network packet from replicator 523, it can notify rendezvous point 515 to end the other route. Thus receiver 552 does not experience any gap in service during the switching process.

Figure 7:
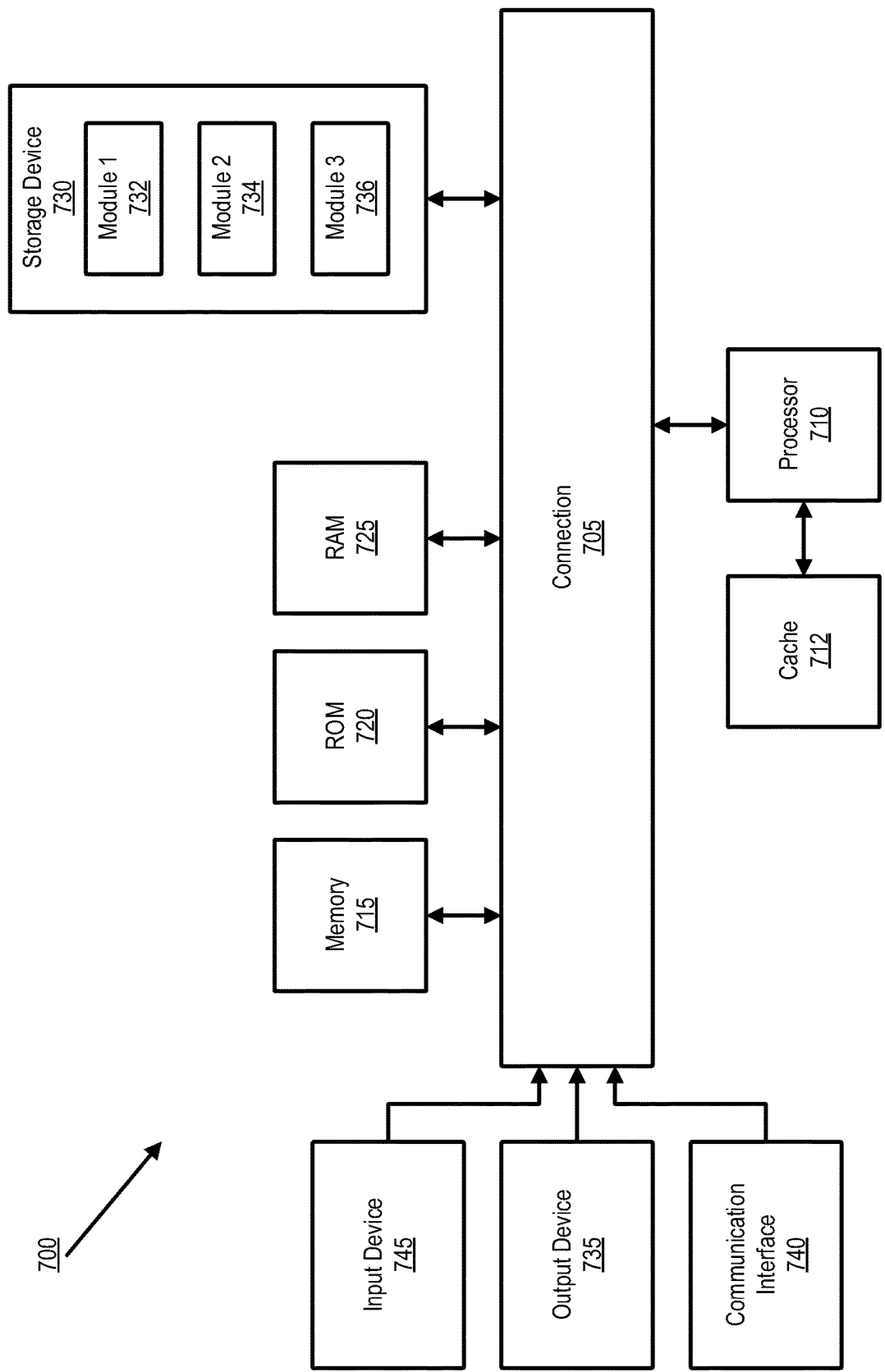
FIG. 7 illustrates an example network device in accordance with some embodiments.

FIG. 7 illustrates a system in accordance with various embodiments. Persons of ordinary skill in the art will also readily appreciate that other systems are possible.

FIG. 7 illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   determining a connection map for a software-defined network, including a plurality of receivers and a plurality of multicast replicators, wherein the connection map is based on one or more policies;
   determining, based on the connection map, a first connection path through one or more of the plurality of multicast replicators to a first receiver of the plurality of receivers;
   forwarding a packet to the first receiver through the one or more of the plurality of multicast replicators based at least in part on the connection map;
   receiving information about one or more of the plurality of multicast replicators, wherein the information includes at least performance of the one or more of the plurality of multicast replicators operating to provide network service access through the software-defined network; and
   switching to a second connection path with a different one or more multicast replicators of the plurality of multicast replicators to the first receiver based on the received information.

2. The method of claim 1, further comprising:
   receiving at least one multicast application-route policy for the software-defined network, wherein the multicast application-route policy is based on at least one of a plurality of multicast groups, geographic location, bandwidth indications, system load, and performance.

3. The method of claim 2, wherein the multicast application-route policy is specific to one or more multicast groups and is selected based on inclusion of the one or more of the plurality of multicast replicators in the one or more multicast groups.

4. The method of claim 1, wherein the plurality of receivers and the plurality of multicast replicators form a plurality of multicast groups.

5. The method of claim 1, wherein the switching of the connection paths occurs dynamically across the plurality of multicast replicators based on real-time selections of multicast replicators of the plurality of multicast replicators.

6. The method of claim 1, wherein the different one or more multicast replicators of the plurality of multicast replicators is dynamically selected according to a multicast application-route policy based on changing network conditions in the software-defined network associated with the one or more of the plurality of multicast replicators.

7. The method of claim 1, wherein the plurality of multicast replicators are configured to advertise replicator status information to a plurality of multicast routers and at least one of the plurality of multicast routers are configured to facilitate:
   the selection of the one or more of the plurality of multicast replicators based on multicast application route-policy according to the advertised replicator status information of the one or more of the plurality of multicast replicators; and the switching of the connection paths between the plurality of receivers and the multicast replicators based on the selection.

8. A system comprising:
one or more processors; and
at least one computer-readable storage medium having stored therein instructions which, when executed by the one or more processors, cause the one or more processors to:
determine a connection map for a software-defined network, including a plurality of receivers and a plurality of multicast replicators, wherein the connection map is based on one or more;
determine, based on the connection map, a first connection path through one or more of the plurality of multicast replicators to a first receiver of the plurality of receivers;
forward a packet to the first receiver through the one or more of the plurality of multicast replicators based at least in part on the connection map;
receive information about one or more of the plurality of multicast replicators, wherein the information includes at least performance of the one or more of the plurality of multicast replicators operating to provide network service access through the software-defined network; and
switch to a second connection path with a different one or more multicast replicators of the plurality of multicast replicators to the first receiver based on the received information.

9. The system of claim 8, further comprising instructions which when executed by the one or more processors, cause the one or more processor to:
receive at least one multicast application-route policy for the software-defined network, wherein the multicast application-route policy is based on at least one of a plurality of multicast groups, geographic location, bandwidth indications, system load, and performance.

10. The system of claim 9, wherein the multicast application-route policy is specific to one or more multicast groups and is selected based on inclusion of the one or more of the plurality of multicast replicators in the one or more multicast groups.

11. The system of claim 8, wherein the plurality of receivers and the plurality of multicast replicators form a plurality of multicast groups.

12. The system of claim 8, wherein the switching of the connection paths occurs dynamically across the plurality of multicast replicators based on real-time selections of multicast replicators of the plurality of multicast replicators.

13. The system of claim 8, wherein the different one or more multicast replicators of the plurality of multicast replicators is dynamically selected according to the multicast application-route policy based on changing network conditions in the software-defined network associated with the one or more of the plurality of multicast replicators.

14. The system of claim 13, wherein the changing network conditions in the software-defined network associated include performance of the one or more of the plurality of multicast replicators operating to provide network service access through the software-defined network.

15. The system of claim 8, wherein the plurality of multicast replicators are configured to advertise replicator status information to a plurality of multicast routers and at least one of the plurality of multicast routers are configured to:
select the one or more of the plurality of multicast replicators based on multicast application route-policy according to the advertised replicator status information of the one or more of the plurality of multicast replicators; and
switch the connection paths between the plurality of receivers and the multicast replicators based on the selection.

16. At least one non-transitory computer-readable storage medium having stored therein instructions which, when executed by at least one processor, cause the at least one processor to:
determine a connection map for a software-defined network, including a plurality of receivers and a plurality of multicast replicators, wherein the connection map is based on one or more;
determine, based on the connection map, a first connection path through one or more of the plurality of multicast replicators to a first receiver of the plurality of receivers;
forward a packet to the first receiver through the one or more of the plurality of multicast replicators based at least in part on the connection map;
receive information about one or more of the plurality of multicast replicators, wherein the information includes at least performance of the one or more of the plurality of multicast replicators operating to provide network service access through the software-defined network; and
switch to a second connection path with a different one or more multicast replicators of the plurality of multicast replicators to the first receiver based on the received information.

17. The at least one non-transitory computer-readable storage medium of claim 16, further comprising instructions which when executed by the one or more processors, cause the at least one processor to:
receive at least one multicast application-route policy for the software-defined network, wherein the multicast application-route policy is based on at least one of a plurality of multicast groups, geographic location, bandwidth indications, system load, and performance.

18. The at least one non-transitory computer-readable storage medium of claim 17, wherein the multicast application-route policy is specific to one or more multicast groups and is selected based on inclusion of the one or more of the plurality of multicast replicators in the one or more multicast groups.

19. The at least one non-transitory computer-readable storage medium of claim 16, wherein the plurality of receivers and the plurality of multicast replicators form a plurality of multicast groups.

20. The at least one non-transitory computer-readable storage medium of claim 16, wherein the different one or more multicast replicators of the plurality of multicast replicators is dynamically selected according to a multicast application-route policy based on changing network conditions in the software-defined network associated with the one or more of the plurality of multicast replicators.

* * * * *